United States Patent [19]

Forberg et al.

[11] 4,161,513

[45] Jul. 17, 1979

[54] METHOD OF PREPARING TITANATES SUITABLE AS ION-EXCHANGE MATERIAL

[76] Inventors: Sevald Forberg, Gillerbacken 15, S-124 42 Bandhagen; Per-Inge Olsson, Mortgatan 11, 4tr, S-133 00 Saltsjöbaden, both of Sweden

[21] Appl. No.: 859,141

[22] Filed: Dec. 9, 1977

[30] Foreign Application Priority Data

Dec. 15, 1976 [SE] Sweden ................................ 7614116

[51] Int. Cl.² ............................................. C01G 23/00
[52] U.S. Cl. ..................................................... 423/598
[58] Field of Search ......................................... 423/598

[56] References Cited

U.S. PATENT DOCUMENTS

| | | | |
|---|---|---|---|
| 2,111,460 | 3/1938 | Rockstroh | 423/598 |
| 3,328,117 | 6/1967 | Emslie et al. | 423/598 |
| 3,647,364 | 3/1972 | Mazdiyasni et al. | 423/598 |
| 3,725,539 | 4/1973 | Spangenberg | 423/598 |

FOREIGN PATENT DOCUMENTS

| | | | |
|---|---|---|---|
| 91214 | 7/1961 | Denmark. | |
| 1453395 | 9/1966 | France. | |
| 431116 | 11/1974 | U.S.S.R. | 423/598 |

*Primary Examiner*—Herbert T. Carter
*Attorney, Agent, or Firm*—Birch, Stewart, Kolasch and Birch

[57] ABSTRACT

A method of preparing titanates suitable as cation exchange material which comprises reacting a cation forming base with a solution of titanium tetrachloride in an organic solvent comprising a solvent selected from the group consisting of alcohols, ketones and mixtures thereof to produce a complex titanate precipitate, separating the precipitate from the residual solution and recovering the titanate, said reaction being carried out in the presence of an amount of water sufficient to cause precipitation of the titanate precipitate.

13 Claims, 3 Drawing Figures

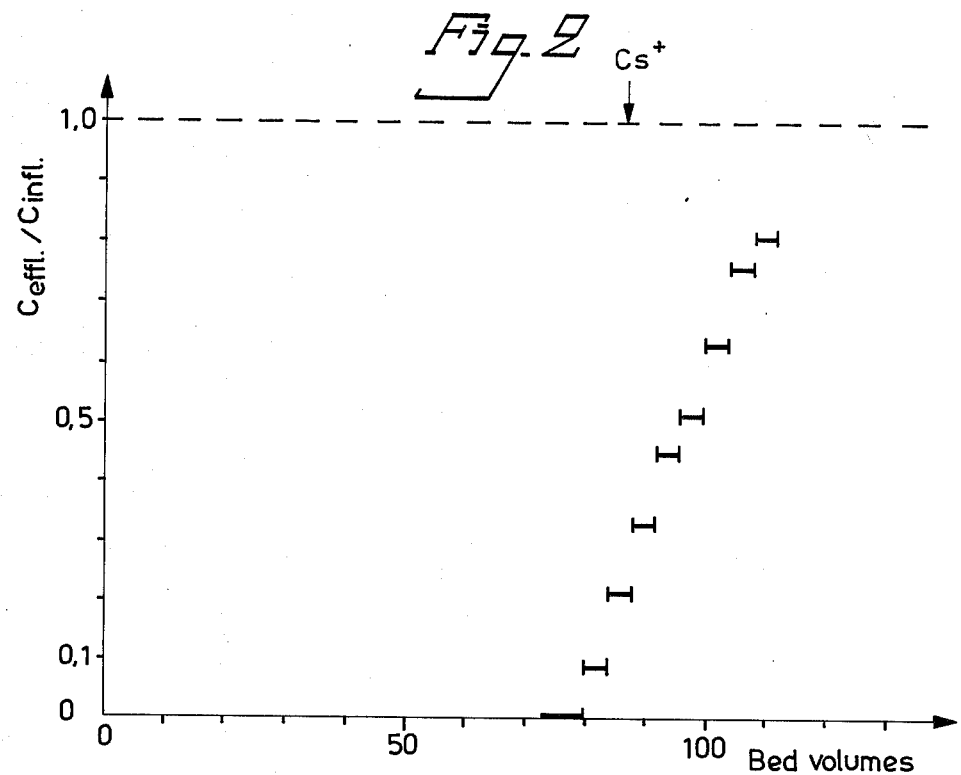
Fig. 2
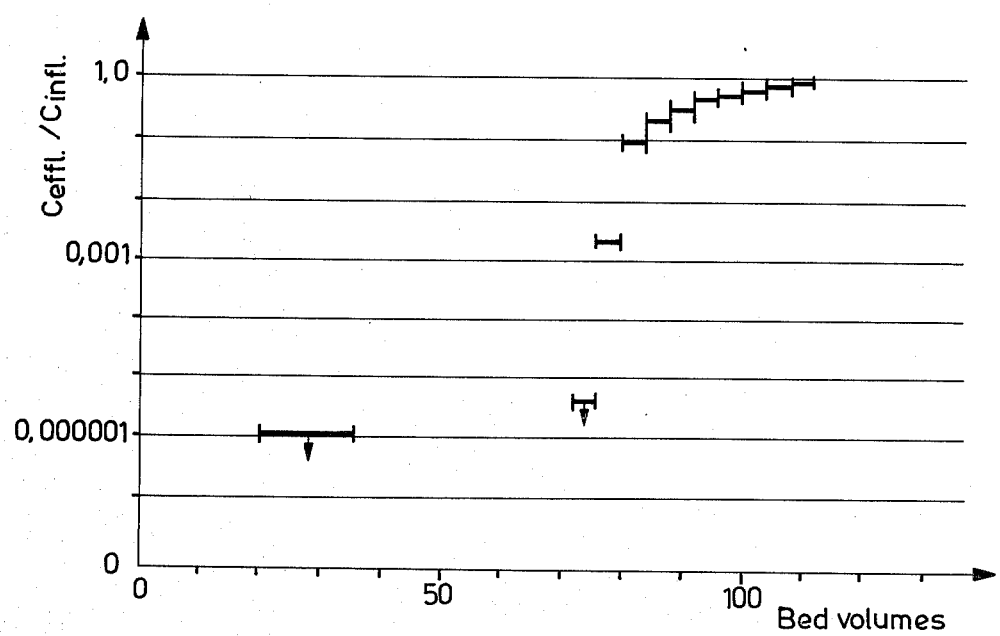

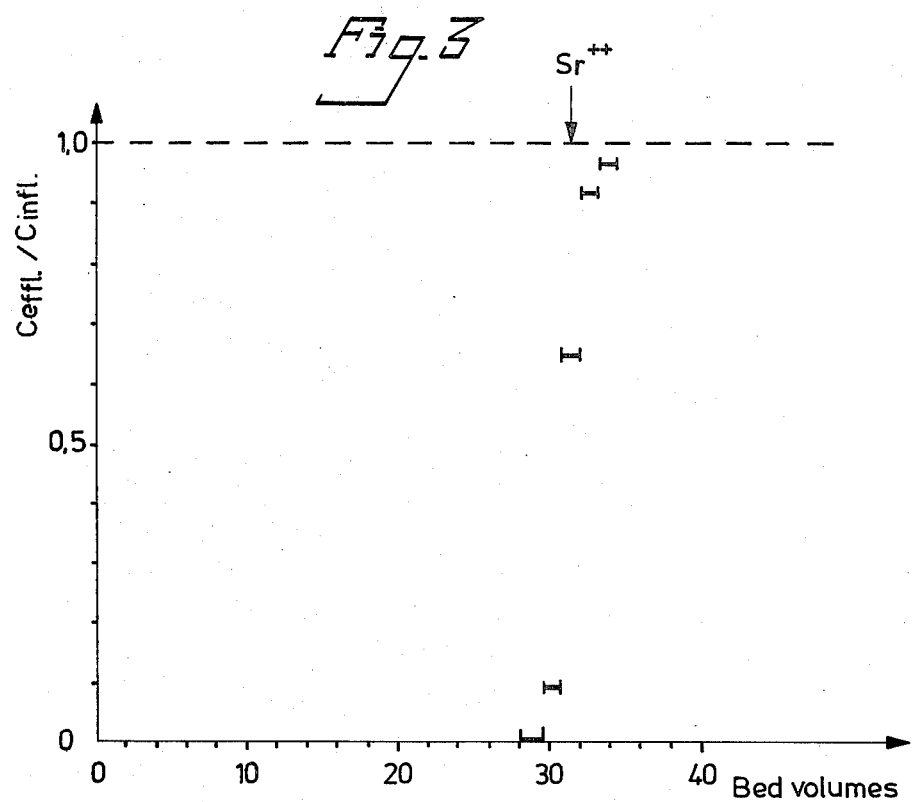
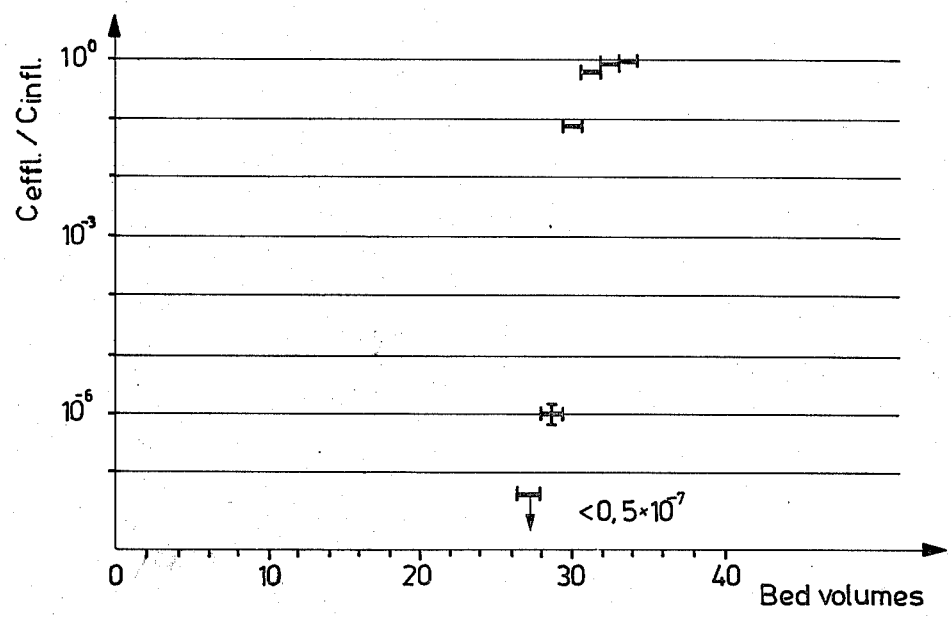

METHOD OF PREPARING TITANATES SUITABLE AS ION-EXCHANGE MATERIAL

The present invention relates to a method of preparing titanates suitable as ion exchange material. The invention also relates to titanates produced in accordance with the method.

Since organic ion exchangers are damaged by excessively high doses of ionizing radiation, suitable inorganic ion exchangers have long been sought for within the reactor technology. Many such ion exchangers are thus available, although only zirconium-based in, for example, phosphate form will be mentioned here.

If the properties of sufficient exchange capacity, selectivity and mechanical stability of an inorganic ion exchanger can be combined with good sintering characteristics and a high resistance to leaching, etc., of the end product, the ideal for the compaction of highly-active waste has been reached, particularly if the price is acceptable.

In 1976, Sandia Laboratories, Abuquerque, N. Mex. 87115, USA, published a process which approaches this ideal very closely:

R. W. Lynch et al.: The Sandia Solidification Process — A broad range aqueous waste solidification method. Paper IAEA-SM-207/75 from International symposium on the management of radioactive wastes from the nuclear fuel cycle, Vienna, Mar. 22-26, (1976).

See also Chem. and Eng. News Jan. 12, (1976) pages 32-33.

In the Sandia-report, sodium titanate is promoted as a new ion exchange material having splendid sorption- and sintering properties. The absorption capacity of, for example, Cs has not, however, been entirely satisfactory, and hence it has been necessary to couple a zeolite column downstream of the sodium-titanate column. It is probable that the process, and particularly the sintering process, could be simplified if Cs could be sorbed in a titanate material.

The starting material for the manufacture of ion exchangers has been tetraiso-propyltitanate, the solvent methanol, the precipitating agent NaOH, acetone and water. It has been possible to control the particle size through the acetone/water-relationship.

It has now surprisingly been found, in accordance with the present invention, that titanates suitable as ion exchange material can be produced by a simpler and less expensive synthesis, which from the aspect of process technology, is highly advantageous and in which the properties of the titanate produced can be varied within a wide range through the selection of precipitation conditions and a precipitating agent.

In accordance with the present invention titanates suitable as ion exchange material are produced by reacting a cation-forming base with a solution of titanium tetrachloride in an organic solvent containing or comprising alcohol and/or ketone for precipitating out the titanate, the precipitate being separated from the solution and the titanate recovered.

By means of this method ion exchange material adapted to the prerequisites of, for example, nuclear reactors with respect to the purifying of cooling water can be produced and the properties of the ion exchanger can be controlled in a manner such that there is obtained good selectivity with respect to, e.g., Cs, cesium.

Since there is used a different and far less expensive intermediate product of titanium as the starting material as compared with the starting material used in known processes, there is obtained an inexpensive end product. Titanium tetrachloride is also a readily accessible substance, since it is manufactured in reasonable quantities of technically acceptable quality.

The base used contributes to the exchangeable cation of the ion exchanger and is selected with respect to the intended use of the ion exchanger. According to one embodiment of the invention, the base is a substituted amine or diamine, there being obtained an ion exchane material which is highly absorbent with respect to cesium.

The solvent for $TiCl_4$, which may comprise one or more alcohols, one or more ketones or mixtures thereof, may be either free of water or contain some water without the presence thereof deleteriously affecting the process. Technical qualities of, e.g., acetone and 95% ethanol are well suited. Other organic solvents may be included in the solution. Subsequent to the titanate being precipitated out, the solvent may be recovered by distillation. In the majority of cases the ion exchange material can be produced while using a single organic solvent component in the process, which facilitates recovery.

The mechanism which controls the formation of the complex precipitate suitable as ion exchange material is not fully understood. The use of organic solvents, however, has a decisive influence on the properties of the precipitate, such as grain size, bulk density and specific surface area. These properties are affected by the choice of solvent/solvent mixture for titanium tetrachloride and the base added.

Thus, when precipitating out the titanates, the base may be present in the form of a concentrated aqueous solution or in the form of a solution in water and alcohol and/or ketone. According to another embodiment of the invention, the base may be present in water free form, e.g., dissolved in water free alcohol or ketone, or the base may itself comprise a water free liquid in which it is reacted with the titanium tetrachloride solution. When the base is in water free form, it may be desirable to add water separately after the base has been mixed with the titanium tetrachloride solution, particularly when the titanium tetrachloride is dissolved in water free alcohol and/or ketone. When, for example, the base is water free dimethylamine and the titanium tetrachloride solution is also water free there is not immediately obtained precipitation upon mixing the liquids, but that the precipitation process must be initiated, and can be regulated, by the separate addition of water. When added, the water may be mixed with alcohol and/or ketone.

By varying these conditions, the particle size of the titanate precipitated out during the synthesis can be controlled so that there is obtained a high yield of suitable fraction for desired bottom height or desired flow resistance when used in a solid bed (in a column).

Other solvents, such as $CCl_4$ and dioxane, may be present during the precipitation process without the properties of the product being impaired. In addition to alcohols and ketones it is also possible for other solvents having functional oxygen groups, such as ethers and esters, to the present in the solution during the precipitation process.

When precipitating the titanates in solely aqueous solution there is not obtained, however, a precipitate which is suitable as an ion exchange material in accordance with this invention.

So that the invention will be more readily understood and further features thereof made apparent, the invention will now be described in more detail with reference to the accompanying schematic drawing, in which FIG. 1 is a block schematic flow sheet of the most important steps in a preferred procedure of the method according to the invention. Any slurrying, grinding or screening has not been shown in the Figure, neither has the cooling, heating or agitation.

FIG. 2 illustrates the adsorption of cesium in tests using titanate ion exchange material according to the invention, in which the cation comprises dimethylamine, as described in more detail hereinafter.

FIG. 3 illustrates the adsorption of strontium in a titanate ion exchange material according to the invention, in which the cation is sodium.

Figure 1:
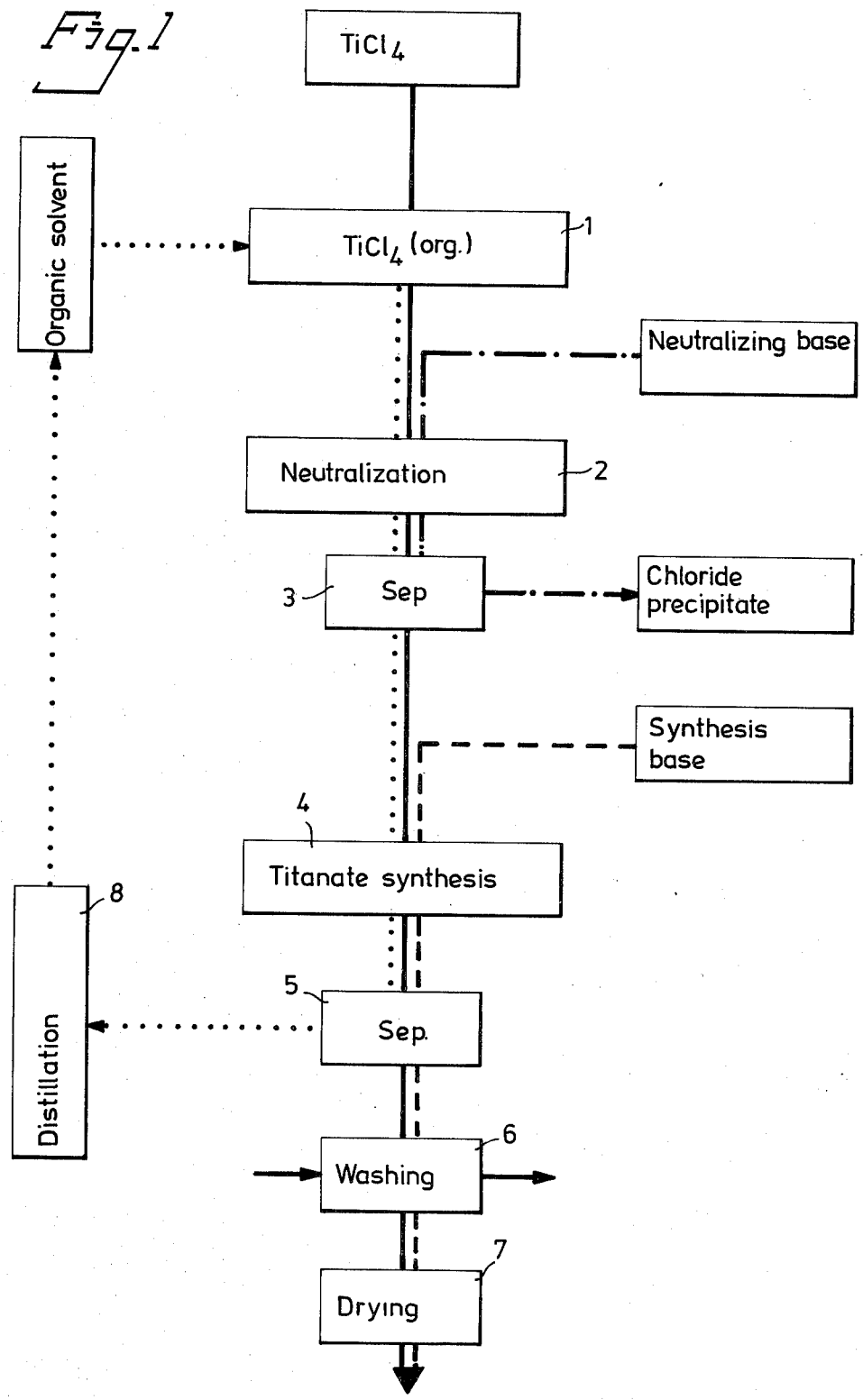

When carrying out the method shown in FIG. 1 there is prepared in the first step (1) a $TiCl_4$-solution. The preferred solvent is methanol, ethanol, isopropanol and/or acetone, either containing or not containing water.

Certain of the bases, hereinafter called synthesis bases, used to precipitate the titanates are relatively expensive. When titanium tetrachloride is dissolved in a water free solvent or in a solvent which is substantially water free, such as absolute ethanol (99.5% in which the remaining 0.5% is water) the requirement of the synthesis bases can be reduced. This is effected by neutralizing HCl formed in the $TiCl_4$-solution by reacting the same with a preliminary neutralizing base which forms in the organic solvent in question not-readily dissolved chloride. Such a preliminary neutralization is effected in treatment step (2) in FIG. 1. The chloride precipitate is separated by filtering ate step (3) or by some other suitable separating method, e.g., centrifugation.

Another purpose with such preliminary neutralization is to reduce the problems which arise due to the heat developed during the reaction. If the neutralization and precipitation of titanates takes place in one and the same step, the need to conduct away the heat which developes places high requirements on the reactor design and will reduce the production capacity of a given reactor. The slurry of chlorides formed during the preliminary neutralization step has completely different flow properties than the titanate precipitate, thereby making it easier to conduct away the heat. Depending upon the degree of preliminary neutralization undertaken, that amount of heat which must be led away from the titanate precipitating stage will be correspondingly reduced. Thus, the production capacity of an existing reactor can be increased and greater freedom is obtained in the design of a future reactor.

In treatment step (4) the synthesis base is reacted with the neutralized titanium tetrachloride solution to precipitate out the titanate. As previously mentioned, this base may be present in different combinations with water and organic solvents, so as to control the particle size of the precipitate.

The precipitate is separated from the solution, e.g., by filtration at step (5), is washed with water (6) and dried under vacuum (7). The separated solution is passed to a distillation column (8) for recovering the solvent.

When the base is dissolved in an organic solvent, this is suitably selected equal to the solvent in the $TiCl_4$-solution, thereby facilitating recovery of the solvent by distillation.

The invention will now be illustrated by means of a number or examples.

EXAMPLE 1

Titanium tetrachloride solutions were prepared by dissolving $TiCl_4$ (99% manufacturer: Riedl-de Haën AG, SEELZE-HANNOVER) while cooling in 95% ethanol (5% water, technical quality), methanol, isopropanol, acetone and in mixtures thereof. The volume ratio $TiCl_4$/solvent was approximately 1:10. The titanate was precipitated out by mixing these solutions, while cooling the same, with the desired base in concentrated aqueous solution or dissloved in water and one of the aforementioned solvents. The amounts of the different solvents used were adapted so that the stoichometric quantities of $TiCl_4$ and the base were mixed. The bases had been concentrated aqueous solution prior to being dissolved in the organic solvent. The bases tried were NaOH, KOH, $NH_3$ (aq, 30%), monomethylamine, dimethylamine, trimethylamine and hydrazine. The precipitate was separated by filtering, washed with water, dried under vacuum at approximately room temperature, crushed and screened. Other steps were also conceivable, for example wet sieving. The screened and dried product was now ready for use as an ion exchange material. By using dimethylamine ( $(CH_3)_2$ — NH) as a base there was obtained an ion exchange material which exhibited a high affinity to cesium.

EXAMPLE 2

2.5 liters of 99% $TiCl_4$ were mixed, whilst cooling, with 22.5 liters of 95% ethanol (5% water, technical quality).

22 liters of $TiCl_4$ (ethanol)-solution were added with 5 liter ammonium-solution (25%, puriss, KEBO AB) in a flow reactor vessel. Titanate was precipitated out and a sieve analysis of the precipitate/recovered gave the following result.

< 63 $\mu$m 400 g
63–125 $\mu$m 400 g
125–500 $\mu$m 900 g

EXAMPLE 3

55 ml of 99% titanium tetrachloride were mixed, whilst cooling, with water free methanol (p.a. Merck) to a volume of 550 ml. A water free solution of NaOH was prepared by dissolving 80 g of water free NaOH in solid form (pastils, p.a. EKA) in 500 ml of water free methanol.

The solutions were mixed, whereupon a titanate precipitate was obtained. At the same time fine-grain NaCl was precipitated out. The fine-grain NaCl-precipitate could be separated from the coarser titanate precipitate by filtration, the NaCl-precipitate passing through the filter. It was also possible, by separately adding water to re-dissolve the NaCl-precipitate. The titanate-precipitate was treated in the same manner as that described in Example 1.

EXAMPLE 4

The steps disclosed in Example 2 were repeated, but with the use of absolute ethanol (99.5% ethanol, the remainder water) as the solvent for the titanium tetrachloride and the sodium-hydroxide. A titanate precipitate which could be used as ion exchange material was obtained.

EXAMPLE 5

Titanate was prepared in the same manner as that described in Example 1, except from the fact that the base was water free dimethylamine (purum, FLUKA), which was reacted with a water free solution of 99% $TiCl_4$ in isopropanol (p.a. Merck). The volume ratio of $TiCl_4$/isopropanol was 1:10. 20 ml of this titanium tetrachloride-solution was admixed with 10 ml of dimethylamine. No immediate precipitation was obtained. By adding approximately 5 ml of water, subsequent to mixing the water free liquids, 1.3 g titanate was precipitated out in desired form. The precipitate could also be obtained by admixing a mixture of water and acetone.

EXAMPLE 6

Water free, or substantially water free titanium tetrachloride solutions were prepared by dissolving $TiCl_4$ in absolute ethanol, water free methanol (p.a. Merck), water free isopropanol (p.a. Merck) and water free acetone. The volume ratio of $TiCl_4$/solvent was 1:10. These solutions were partially neutralized by suspending approximately 2 g of finelyshreaded sodium carbonate ($Na_2CO_3$, p.a., water free Merck) in approximately 50 ml of each solution whilst perculating air therethrough. HCl formed in the $TiCl_4$-solution reacted with $Na_2CO_3$ to form $CO_2$ and NaCl, which similarly to $Na_2CO_3$ is not readily dissolvable in these solutions. The $CO_2$ formed was carried away with the airstream, NaCl and non-reacted $Na_2CO_3$ were filtered off, whereupon precipitation of the titanate was effected in the same manner as that disclosed in example 1, but now with a reduced requirement with regard to the base and cooling. A titanate which could be used as an ion exchange material was recovered in the same manner as that disclosed in Example 1.

EXAMPLE 7

The titanium tetrachloride solutions described in Example 6 were partially neutralized with $NH_3$ (g) dissolved in the same solvent. In this case, HCl formed in the $TiCl_4$-solution reacted with $NH_3$ to form $NH_4Cl$, which is not readily dissolved in these solutions. The $NH_4Cl$ formed was filtered off, whereafter the precipitation of the titanate and the recovery of the precipitate were effected in the same manner as that disclosed in Example 1, but now with reduced requirements with regard to the base and cooling.

When adding a solution of $NH_3$ in 99.5% ethanol (1,6 mole/liter) to 10 ml of a $TiCl_4$-solution in 99.5% ethanol (10% by volume), the following results were obtained.

| The amount of $NH_3$ added in relation to Cl | Water-soluble precipitate ($NH_4Cl$) | Water-insoluble precipitate | Yield of $Na_4Cl$ in % of the theoretically possible yield |
|---|---|---|---|
| mol/mol | g | mg | % |
| 0,3 | 0,511 | 20 | 85 |
| 0,6 | 1,069 | 26 | 89 |
| 0,9 | 1,558 | 24 | 87 |
| 1,2 | 1,662 | 358 | 85 |

This shows that, at room temperature, at least 90% of the HCl formed can be neutralized with $NH_3$ and that 80% can be separated as $NH_4Cl$ without notable titanate losses.

Sandia refer to their ion exchange material as ST (sodium titanate) and state the formula $NaTi_2O_5H$ corresponding to the exchange capacity 5 m-equivalents/g. Reference is also made to an ion exchanger SHT, in which half of the sodium is replaced by hydrogen. The capacity is then halved. The capacity of the products produced in accordance with the present invention have been found to lie at 2-3 mequ/g.

Ion exchangers having other properties have been produced by us by precipitationg with a base other than NaOH. It was possible to increase considerably the selectivity with regard to Cs when precipitating with substituted amines. Irrespective of the fact that the capacitys can be compared with what Sandia call SHT, we will use the designation ST as a starting point when labelling the following, tested titanates.

| Base | Product designation |
|---|---|
| NaOH | ST |
| KOH | PT |
| $NH_3$ (aq) | AT |
| Mono-methylamine (aq) | MT |
| Di-methylamine | DT |
| Tri-methylamine | TT |
| Hydrazine | HT |

Other conceivable bases are, for example, LiHO, quaternary methylamine, ethylamine, morpholine, ethylene diamine, pyridine and piperazin. It is conceivable that by precipitating with one of the enumerated bases or some other base that the titanate can be given special properties in relation to certain ions, similarly to DT and cesium.

All of the titanates tested could be synthesized in coarse-particle form, up to several tenths of mm/in diameter, with practically the total absence of fine particles which require separation by slurrying.

The exchange capacities of MT, DT and TT have been determined by the exchange of Cs with radioactive trace substances, for HT by exchange with $Sr^{2+}$ and for AT by exchange with potassium.

A number of separation factors have been determined between Cs and the relevant base in the form of a water-soluble salt.

Some results are given in the following table:

| Ion exchanger | Capacity mequ/g | pH | Separation factor |
|---|---|---|---|
| MT | 3,2 | 9,5 | 8 |
| DT | 1,7 | 9,5 | 200 |
| TT | 1,3 | 7,9 | 60 |

The separation factor has laid between 1 and 10 for Cs and ammonium and Na in AT and ST in varying conditions.

Given below are the distribution coefficients $K_D$ for Sr, and in one case (HT) the separation factor between Sr and the relevant base in the form of a water-soluble salt:

| Ion exchanger | pH | $K_D$ l/kg | pH | $K_D$ l/kg |
|---|---|---|---|---|
| MT | 7,3 | 2 800 | 3,4 | 5,5 |
| DT | 6,9 | 840 | 2,4 | 2,7 |
| TT | 6,5 | 145 | 2,5 | 0,8 |
| HT | 8,3 | S = 400 | 5,0 | S = 1,0 |

For the purification of cooling water in nuclear reactors there are now used organic mixed-ion-exchangers, which subsequent to being used are cast into large concrete blocks, because of their radio activity. Titanate ion exchangers produced from ion exchange material according to the present invention are expected to have good properties for this purpose. Subsequent to being used, they can be sintered to much smaller volumes than present day concrete blocks. When the titanates are used in the form of, for example, AT and DT there is obtained a good affinity for important ions in the water and there is obtained in exchange ions which give no other long-lived activities than $^{14}C$, which is nevertheless formed in the water and must be removed.

FIG. 2 illustrates the result obtained from a column test using a titanate ion exchanger comprising material according to the invention in which the cation comprises dimethylamine. The Figure illustrates both in linear scale and logarithmic scale the relationship between the cesium-ion-concentration in the effluent and the influent against the number of bed volumes passed on the same linear scale.

The influent had a cecium-ion-concentration of $8.8 \cdot 10^{-3}$ mole/l and a pH of 8. The influent was passed through a column having a height of 0.03 m at a linear flow rate of 0.3 m/hour. As will be seen from the diagram, up to 80 bed volumes of influent could be treated with a high degree of cesium separation before the cesium-ion-cencentration in the effluent began to increase.

FIG. 3 illustrates the result of a column test using a titanate ion exchanger comprising material according to the invention. The cation comprised sodium. The Figure shows both on a linear scale and a logarithmic scale the relationship between the strontium concentration in the effluent and influent against the number of bed volumes passed on a linear scale common to both diagrams.

The influent had a strontium ion concentration of 0.0456 mole/l and a pH-value of 6. The influent was passed through a column having a height of 0.11 m at a linear flow rate of 0.39 m/hour. Up to 30 bed volumes of the influent could be treated with a high degree of separation with regard to strontium before the strontium ion concentration in the effluent began to increase.

We claim:

1. A method of preparing titanates suitable as cation exchange material which comprises dissolving titanium tetrachloride in a water-free or a substantially water-free organic solvent selected from the group consisting of water-free or substantially water-free forms of alcohols, ketone and mixtures thereof;

partially neutralizing hydrochloric acid formed in the titanium tetrachloride solution and removing the chloride by reacting with a base which, in the used solvent, causes the precipitation of not-readily dissolved chloride; separating the precipitated chloride from the solution;

reacting a cation forming base with the neutralized solution to produce a titanate precipitate;

separating the precipitate from the residual solution and recovering the titanate.

2. The method of claim 1 wherein the ketone is acetone.

3. The method of claim 1 wherein the base is a substituted amine or diamine.

4. The method of claim 1 wherein the base is dimethylamine.

5. The method of claim 1 wherein the base is in the form of a concentrated aqueous solution when it is reacted with the titanum tetrachloride solution 6. A method for preparing titanates, suitable as a cation exchange material which comprises dissolving titanium tetrachloride in a substantially anhydrous organic solvent selected from the group consisting of alcohols, ketones and mixtures thereof, at least partially neutralizing the hydrochloric acid formed in said solution by reacting said acid with an anhydrous neutralizing base which causes precipitation of a chloride which is substantially insoluble in the solvent, removing the chloride precipitated from the solution, reacting said solution with a cation forming base selected from the group consisting of ammonia, substituted amines and diamines and hydrazine to produce a titanate complex precipitate, separating the precipitate from the residual solution and recovering the titanate, said reaction with the cation forming base being carried out in the presence of an amount of water sufficient to cause precipitation of the titanate precipitate.

7. The method of claim 6 wherein the water is contained in the titanium tetrachloride solution.

8. The method of claim 6 wherein the water is contained in the base.

9. The method of claim 6 wherein the water is separately added to the reaction.

10. The method of claim 6 wherein the water is formed in situ from the reaction components when the base is a hydroxide.

11. The method of claim 6 wherein the anhydrous organic solvent is 99.5% ethanol.

12. The method of claim 6 wherein the titanate precipitate is washed with water which causes an agglomeration of the particles and a formation of a more coarse-grained product.

13. The method of claim 12 wherein the washed precipitate is dried at a temperature low enough to avoid calcining and sintering and the cation exchange material is recovered in a coarse-grained form.

* * * * *